C. H. THOMPSON.
DIES FOR MAKING FIN CUTTER PLOW SHARES.

No. 176,149. Patented April 18, 1876.

Attest:
John Lane
L. W. Layton

Inventor:
Charles H. Thompson

UNITED STATES PATENT OFFICE.

CHARLES H. THOMPSON, OF CHICAGO, ILLINOIS, ASSIGNOR OF ONE-HALF HIS RIGHT TO N. S. BOUTON, OF SAME PLACE.

IMPROVEMENT IN DIES FOR MAKING "FIN-CUTTER" PLOWSHARES.

Specification forming part of Letters Patent No. 176,149, dated April 18, 1876; application filed January 22, 1876.

*To all whom it may concern:*

Be it known that I, CHARLES H. THOMPSON, of Chicago, in the county of Cook and State of Illinois, have invented certain new and useful Improvements in Manufacturing Fin-Cutter Plowshares; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to the manufacture of plowshares having a fin-cutter projecting upward for dividing the furrow-slice from the land; the fin being a thin, sharp-edge cutter along the land-side end of the share, and projecting above the share more or less, usually the depth of plowing, and known by name "fin-cutter plowshare," and heretofore well known when made of cast-iron.

In my invention I first provide dies of a proper construction; second, provide a share and fin-cutter, each properly and separately prepared, after which I weld the fin-cutter to the share between the dies, as is hereinafter fully explained and set forth.

Figure 1:
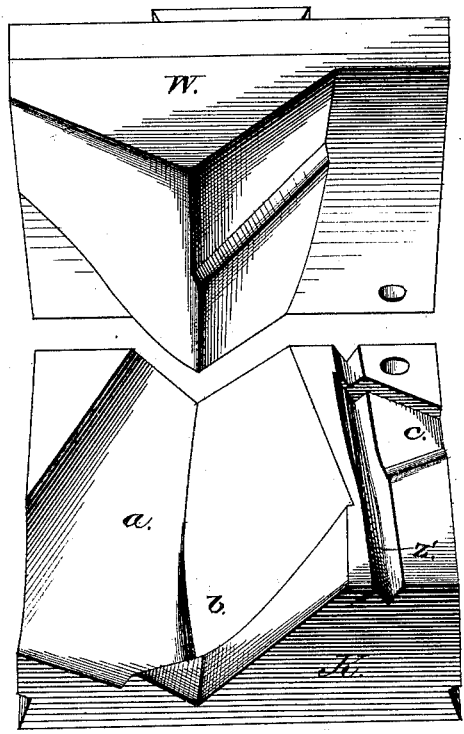
Figure 2:
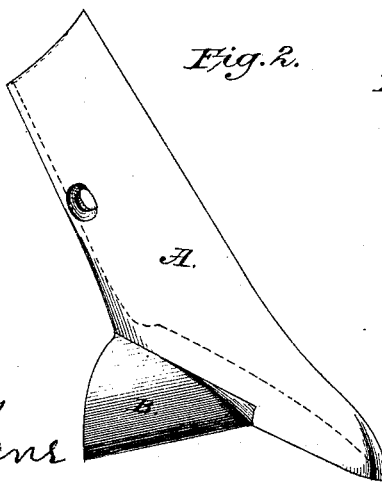
Figure 3:
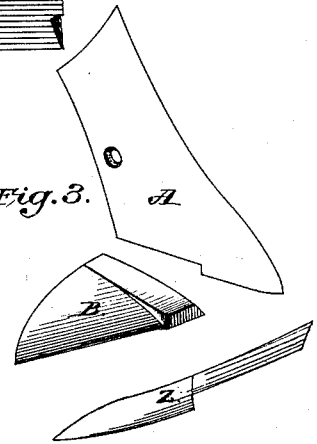

Figure 1 shows the bottom die K of the pair, with the seat $a$ fitting the share, and the seat $b$ fitting the fin-cutter; also a groove, $Z'$, with the depression $c$. W is the upper die of the pair, shown elevated above the bottom die. This upper die is of a proper form, fitting the face of the share and side of the fin-cutter, also fitting the outer side of the fin-cutter when the fin is being welded to the lip-bar Z, as hereinafter explained. Fig. 2 shows the completed fin-cutter plowshare, A being the share, B the fin-cutter, and Z a lip projecting downward over the land-side. Fig. 3 shows the prepared parts—share, fin, and lip-bar—before being welded together between the dies K W.

In use, the dies K W are placed in a drop-press, the die K being secured to the bed and the die W to the hammer, and are operated in the usual manner. The fin-cutter blank B and bar Z are heated to a welding temperature. When the bar Z is placed in the groove $Z'$, and the fin-blank in the depression $c$, the end of the fin-blank resting on the bar Z, the hammer, with die W, is now let fall, and by a single blow the parts will be welded together. The fin-blank and bar thus formed is again heated to a welding temperature, and the share-blank A also heated to a welding temperature. The fin-blank is now placed in the seat $b$, and the share-blank in the seat $a$, with its land-side end resting against the side of the fin-cutter and on the bar Z. The hammer-die W, having been raised to a proper height, is now let fall upon the share and fin-cutter, and by a single blow the parts will be usually welded together and formed to the desired shape. Additional blows are given when required. On removing the thus welded fin-cutter plowshare from the dies, it will be formed completed to the shape of the matrix-mold formed by the seats $a\ b$, and the coming together of the dies W K.

It is obvious that the share may be of any ordinary construction, and either with or without the turn-down lip Z, and that the dies may be varied in form, conforming to the fin-cutter plowshare desired to be manufactured. I make no claim to forming a fin-cutter plowshare from one piece of metal, as by bending a piece of thin metal between dies, such having been heretofore attempted and abandoned.

I claim—

The dies W K, constructed, arranged, and operating substantially as described, for the manufacture of fin-cutter plowshares.

In testimony that I claim the foregoing as my own I affix my signature in the presence of two witnesses.

CHARLES H. THOMPSON.

Witnesses:
JOHN LANE,
L. M. LAYTON.